July 23, 1940.  P. RENFREW  2,208,687
TEMPERATURE COMPENSATING LIQUID METER
Filed Oct. 21, 1939  3 Sheets-Sheet 1
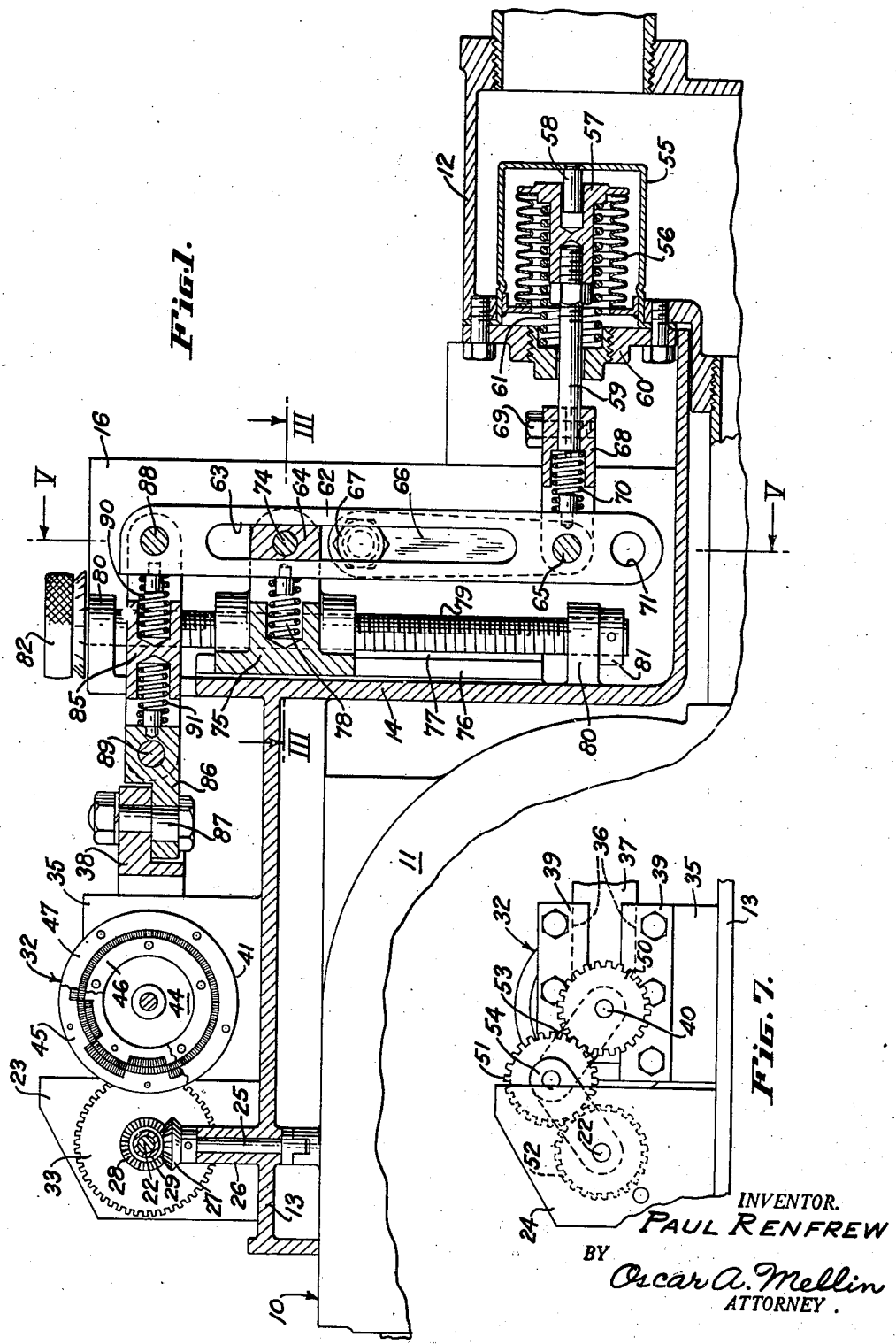
INVENTOR.
PAUL RENFREW
BY
Oscar A. Mellin
ATTORNEY.

July 23, 1940.  P. RENFREW  2,208,687
TEMPERATURE COMPENSATING LIQUID METER
Filed Oct. 21, 1939  3 Sheets-Sheet 2
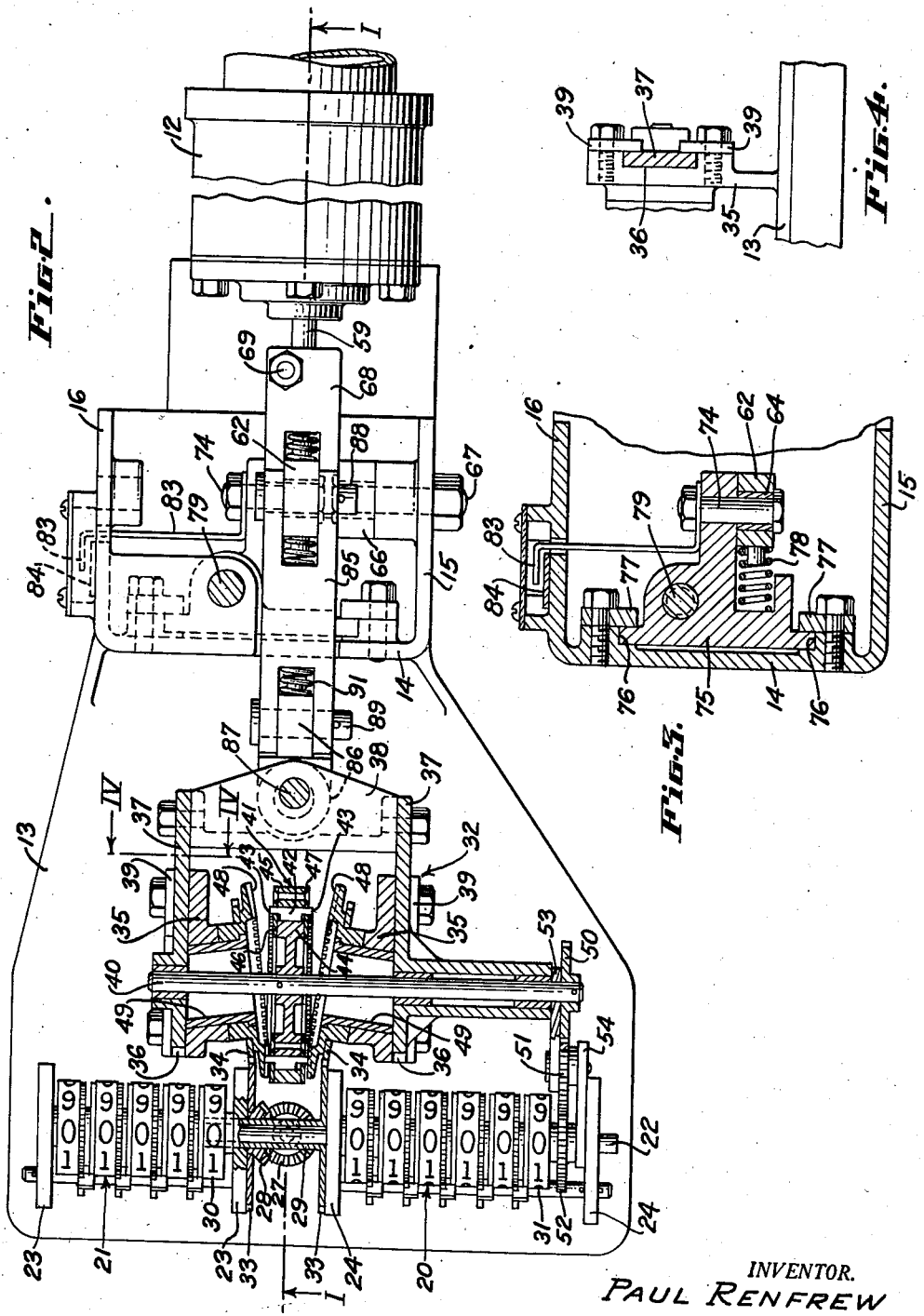
INVENTOR.
PAUL RENFREW
BY Oscar A. Mellin
ATTORNEY.

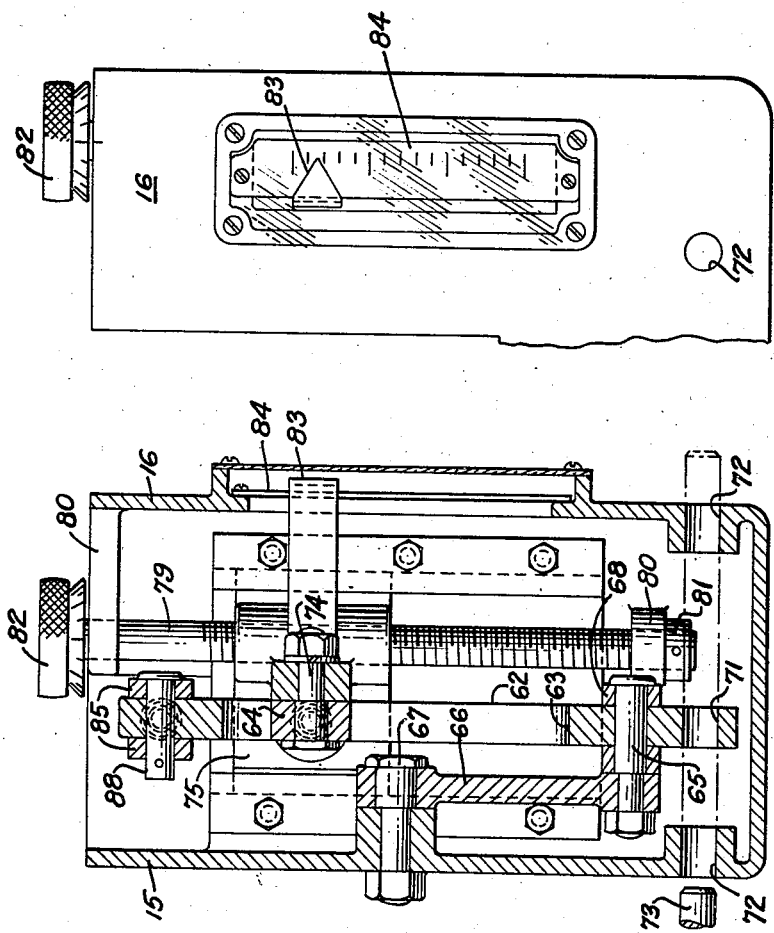

Patented July 23, 1940

2,208,687

UNITED STATES PATENT OFFICE 2,208,687

TEMPERATURE COMPENSATING LIQUID METER

Paul Renfrew, Berkeley, Calif., assignor to Ralph N. Brodie Company, Oakland, Calif., a corporation of California Application October 21, 1939, Serial No. 300,587

11 Claims. (Cl. 73—233)

This application is a continuation in part of my abandoned application entitled "Liquid meter," filed May 11, 1936, and bearing Serial No. 79,132.

The invention relates generally to liquid meters and is more particularly directed to a liquid meter wherein the volume variations of the fluid metered, due to temperature changes, is automatically compensated for.

It is a well known fact that lubricating oils, gasoline and other oils expand and contract with changes in temperature. Consequently, in the trade, oils are usually sold by volume at a temperature of sixty degrees. Therefore, if the oil to be delivered is above or below this temperature, the volume change must be calculated and compensated for so that the customer receives a quantity of oil which would be the correct volume to be delivered at sixty degrees temperature.

It is the principal object of my present invention to provide an improved liquid meter which will automatically compensate for volume changes of the fluid, due to temperature variation, by automatically varying the ratio of operation between the meter measuring mechanism and the meter counter mechanism promptly as such variations occur so that the latter will correctly indicate the volume of liquid passing through the measuring mechanism at an arbitrary temperature, to employ a means for regulating the rate of compensation in proportion to the coefficient of expansion of the fluid to be measured, whereby the apparatus may be conditioned for dispensing fluids of different specific gravities, and to make provisions for the elimination of lost motion or free play thus to provide a compensating mechanism of such extreme accuracy as to immediately compensate for the most minute temperature induced changes of volume of such volatile fluids as gasoline, etc.

I accomplish this object by providing a variable ratio transmission mechanism between the meter measuring mechanism and the meter counter mechanism, which variable ratio transmission is automatically adjusted thermostatically in response to changes in the temperature of the liquid entering the meter, to change the ratio of operation between said measuring and counter mechanisms and thus compensate for such temperature changes so that the counter will correctly indicate the volume of the liquid passed through the meter at sixty degrees temperature, by regulating the rate of such ratio change in proportion to the specific gravity of the liquid to be metered, and by providing a transmission mechanism of the constant mesh gear type capable of effecting infinite variations in the ratio of transmission between the minimum and maximum ratio capacities of said transmission mechanism.

One form which the invention may assume is exemplified in the following description and illustrated by way of example in the accompanying drawings, in which:

Fig. 1 is a longitudinal sectional view through a meter embodying a preferred form of my invention, and taken on the line I—I of Fig. 2.

Fig. 2 is a top plan view, partly in section.

Fig. 3 is a detail sectional view taken on the line III—III of Fig. 1.

Fig. 4 is a detail sectional view taken on the line IV—IV of Fig. 2.

Fig. 5 is a transverse vertical sectional view taken on the line V—V of Fig. 1.

Fig. 6 is a partial elevation looking towards the right-hand side of Fig. 5.

Fig. 7 is a detail elevation of the driving connection between the variable ratio transmission mechanism and the counter mechanism.

Referring particularly to Fig. 1 of the drawings, 10 indicates a liquid meter which may be of any preferred type and therefore need not be herein illustrated in detail. As shown, the meter includes a meter casing 11 having an inlet connection 12 which will be associated with a source of supply of the fluid to be metered. A frame mounted on or formed integral with the meter casing 11 provides a table plate 13 which joins a vertical transverse wall 14 having opposed vertical side walls 15 and 16 extending rearwardly from its opposite vertical edges.

The counter mechanism is mounted on the forward portion of the table plate 13 and comprises, in the present instance, two axially aligned counter units indicated generally by the reference numerals 20 and 21, the counter unit 20 functioning to register the volume of the metered fluids on a basis of 60° F., and the counter unit 21 functioning to register the actual volume of fluid passed through the meter.

Both of these counter units may be of the same general construction, each involving a series of counter wheels and provided with suitable transfer means between each digit wheel and the digit wheel of next higher denomination. In the preferred embodiment, as shown in Figs. 1 and 2, both counter units are mounted on a single transverse counter wheel shaft 22 which is supported in two pairs of relatively spaced upright bracket plates 23, 23 and 24, 24, and between the adjacent counter wheels are provided transfer means of the Geneva gear type.

A counter drive shaft 25, which is driven by the volume measuring mechanism of the meter 10, is vertically journalled in a bearing 26 projecting upwardly from the table plate 13 between the spaced inner bracket plates 23 and 24 of the two counter units. Secured to the upper end of the shaft 25 is a bevel gear 27 in constant mesh with a companion bevel gear 28 which is fixed on a sleeve 29 journalled to rotate on the counter shaft 22. As shown in Fig. 2, this sleeve extends through the adjacent bracket plate 23 and carries the units counter wheel 30 of the actual volume counter 21. Obviously this arrangement provides a direct drive of fixed ratio between the meter and the units wheel 30 of the counter unit 21.

The drive shaft 25 also drives the units counter wheel 31 of the counter unit 20, not directly but through a variable ratio transmission mechanism generally designated by the reference numeral 32, and to this end the sleeve 29, previously referred to, is provided with a pair of relatively spaced drive gears 33 fixed to rotate therewith, as most clearly illustrated in Fig. 2.

In the preferred embodiment of the invention I employ a variable ratio transmission mechanism of the same general character as that disclosed in my copending application entitled "Variable ratio transmission mechanism," filed September 20, 1939, and bearing Serial No. 295,779, which copending application is a continuation in part of the abandoned application previously identified, and to which copending application reference may be had for a more complete disclosure of details of construction involved in such mechanism.

As herein disclosed, the variable ratio transmission mechanism 32 includes a stationary frame structure comprising relatively spaced parallel side walls 35 which extend upwardly from the table plate 13 and have formed in their respective outer surfaces horizontally disposed companion slideways 36 slidably receiving the opposed parallel limbs 37 of a clevis frame 38, said limbs being retained in said slideways by gib plates 39 as shown in Fig. 4.

Journaled in bearing bosses formed on the opposed limbs 37 of the slidable clevis frame 38 is a horizontal driven shaft 40 disposed parallel to the counter shaft 22. As shown in Fig. 2, the shaft 40 extends through aligned openings in the stationary walls 35, which openings are of sufficient size to provide the necessary clearance for said shaft as it is adjusted with the clevis frame in which it is journaled.

Mounted on the shaft 40, midway between the walls 35, is a crown-wheel 41 carrying a continuous concentric series of relatively thin radial driving plates 42 longitudinally disposed in contacting juxtaposition so as to be independently slidable in a shuttlewise manner axially of said wheel, the opposite ends of said plates extending somewhat beyond the opposite sides of the crown-wheel whereby the continuous concentric series thereof provide opposed crown-gears 43, 43. The hub portion 44 of the crown-wheel is fixed on the shaft 40 and its separate rim portion 45 is spaced therefrom to provide the intermediate space in which the crown-gear plates 42 are slidably disposed. The outer periphery of said hub portion 44 and the inner periphery of said rim portion 45 of the crown-wheel are longitudinally grooved at relatively staggered circular intervals, as shown in Fig. 1, and the several plates 42, each of which is shaped to have a stop wing along one edge thereof, are arranged in groups with the stop wings of each group of plates reversely disposed radially in relation to those of the next adjacent group to engage within said circularly staggered longitudinal grooves and form a driving connection between the separate hub and rim portions of the crown-wheel, the several plates 42 being limited in their respective sliding movements by inner rings 46 and by outer rings 47 which are secured in place to overlap the opposite ends of the stop wings of the respective groups of driving plates 42.

With particular reference to Fig. 2 of the drawings, it will be noted that similar mechanisms on opposite sides of the crown-wheel 41 comprise duplicate acute bevel ring gears 48, 48 which have fixed thereto respective gears 34, 34 in constant mesh with the drive gears 33, 33 previously described. These bevel gears face the adjacent sides of the crown-wheel 41 and are journaled on opposed tubular bearing sleeves 49, 49 which are carried by the respective stationary walls 35 in positions to surround the crown-wheel shaft 40, said bearing sleeves defining the size of the clearance openings previously referred to.

It will be observed that these bearing sleeves 49, 49 are somewhat tilted inwardly and rearwardly in a horizontal plane intersecting the axis of the shaft 40 so as to oppositely angle the bevel gears 48, 48 to a like degree whereby to insure constant intermeshing of said gears with the adjacent crown-gears 43, 43 only on one side of the crown-wheel axis, with the points of deepest intermesh in the horizontal plane intersecting not only the crown-wheel axis but also the axes of both bevel gears. This angling of the bevel gears is such that, at the point of deepest intermesh, the fully intermeshed teeth of both bevel gears will be substantially parallel to each other and to the teeth of the crown-gears with which they are meshed.

The bevel gears 48, 48 are relatively arranged to align the teeth of one thereof with the tooth spaces of the opposed bevel gear so that, as the teeth of one of said gears engage the crown-gear plates 42 at one end thereof and translate said plates in conformity with the tooth shape, the opposite ends of the translated plates will enter the tooth spaces of the opposed bevel gear. The intermeshing of the bevel gears 48, 48 with the opposed crown-gears 43, 43 will accurately arrange the several crown-wheel driving plates 42 in the proper manner to form the teeth and tooth spaces of said crown-gears.

An extended end of the driven shaft 40 has fixed thereon a gear 50 which meshes with an idler gear 51 that, in turn, meshes with a gear 52 journaled on the counter shaft 22 and attached to the units counter wheel 31 of the counter unit 20, the idler gear 51 being journaled on the pivot pin connecting two toggle links 53 and 54 with the link 53 loosely pivoted on the shaft 40 and the link 54 loosely pivoted on the shaft 22, as shown in Figs. 2 and 7.

In the operation of the described transmission mechanism which drives the counter unit 20, the opposed bevel gears 48, 48 will, through the pairs of companion gears 33 and 34, be rotated in unison at a speed proportional to the volume of fluid flowing through the meter.

From Fig. 2 it will be evident that when the axis of the crown-wheel 41 coincides with the cone axes of the bevel gears, the pitch circle of intermesh will be uniform both with respect to the cone axis and to the crown-gear axis and the mechanism will produce a one to one driving ratio. With this adjustment there will be formed in the crown-gears 43, 43, due to the longitudinal actuation of the crown-gear plates 42, the same number of teeth as there are in each of said bevel gears. For example, if each bevel gear has forty teeth, said one to one ratio intermesh will actuate the crown-gear plates to form forty teeth in each of the opposed crown-gears 43.

It will further be understood that if the clevis frame 38 is translated, by the temperature responsive means which will later be described, to offset the crown-wheel axis relative to the axes of the bevel gears, the intermesh will occur on greater or less pitch circles of the bevel gears to proportionately vary the produced driving ratio.

Obviously, since the bevel gears have a fixed number of teeth and since the crown-gears may be adjusted to intermesh therewith at different distances from the bevel gear axes, it follows that the number of teeth formed in the crown-gears by their intermeshing engagement with said bevel gears varies as such distance of intermesh varies.

Continuing the previous example in which it was considered that the bevel gears have forty teeth, it will be evident that the clevis frame may be translated to cause the forty tooth bevel gears to actuate the crown-gear plates to form forty-one teeth on the crown-gears or said clevis frame may be translated to cause the bevel gears to actuate said plates to form only thirty-nine teeth on said crown-gears.

Also it should be evident that, since the changes may be of infinite progression, as distinguished from a step-by-step progression or a tooth-by-tooth progression, there will be an infinite number of possible changes between such one-tooth increase or decrease which involve only a fractional part of a tooth pitch insofar as the number of teeth formed on the crown-gears is concerned. For example, an adjustment could occur wherein the forty teeth of the bevel gears, engaged by the crown-gears nearer the axes of said bevel gears, will, during one revolution of the crown-wheel, actuate the crown-gear plates to form forty and a fraction teeth, or, another adjustment could occur wherein the crown-gears engage the bevel gears at a greater distance from their axes, in which case the crown-gear plates will be actuated to form thirty-nine and a fraction teeth in the crown-gears during one revolution thereof. In such instances there will be a more or less continuous shuttlewise sliding of the crown-gear plates during the intermeshing thereof with the bevel gears, to rearrange said plates during each revolution of the crown-wheel.

From the above it will be evident that this transmission mechanism between the meter 10 and the counter unit 20 provides a constant mesh gear transmission forming a continuous and positive drive between said meter and counter unit and capable of effecting infinite variations in the ratio of transmission, between the minimum and maximum ratio capacities of the mechanism, in response to temperature variations of the metered fluid, so that the counter unit 20 will indicate the volume of fluid passing through the meter corrected for variations in temperature.

In one embodiment of the present invention, similar to that herein illustrated and described, I have attained in said transmission mechanism driving ratios infinitely variable between seven to eight and one to one and between one to one and nine to eight.

The correction or compensation for said temperature variations of the metered fluid is automatically effected through the translation of the clevis frame 38 by temperature responsive means which, in the preferred embodiment herein disclosed, comprises a thermostatic chamber 55 which is mounted a "Sylphon" tube 56 connected to a reciprocable plunger 57. This chamber, between its walls and the "Sylphon" tube, is filled with a thermostatic fluid and said chamber is mounted in the inlet connection 12 in the path of the incoming fluid so that the thermostatic fluid will expand or contract in response to temperature variations in the liquid passing into the meter and will effect a comparable reciprocation of the "Sylphon" tube 56 and its associated plunger 57. As shown in Fig. 1, the plunger 57 is centrally guided by a stationary centering stud 58 and is provided with a plunger stem 59 which extends to the exterior through a head-plate 60 which supports the chamber 55 and forms a closure for the inlet connection 12. A coil spring 61 is disposed within the "Sylphon" tube 56 between the plunger 57 and the head-plate 60 and tends to normalize said "Sylphon" tube and its connected plunger and plunger stem.

The connections through which motion is transmitted from the temperature controlled "Sylphon" stem 59 to the reciprocable clevis frame 38 of the variable ratio transmission 32 includes a vertically disposed lever 62 having formed therein a longitudinal elongated slot 63 in which is slidably disposed an adjustable fulcrum block 64. This lever 62 is supported on a pivot stud 65 carried by a pendulum arm 66 that is, at its upper end, pivotally mounted on the side wall 15 by a pivot stud 67, as shown in Fig. 5. The plunger stem 59 is pivotally connected to the lower end portion of the lever 62, at the pivot stud 65, by means of a yoke member 68 whose inner end is bored to receive the outer end of said plunger stem and is longitudinally split and provided with a clamp screw 69 by which said yoke may be adjustably clamped on said plunger stem, the furcations at the opposite end of said yoke extending upon opposite sides of the lever 62 and pivotally engaging the pivot stud 65.

To eliminate free play at this pivotal connection and to automatically compensate for wear thereof, I provide a take-up spring 70 which is seated in the crotch of the yoke member 68 and bears against the adjacent edge of the lever 62.

The lever 62 is provided at its lower end with a transverse bore 71 which, when said lever is in a vertical position as shown in Fig. 1, becomes aligned with companion bores 72, 72 formed in the respective walls 15, 16 of the frame, as shown more clearly in Fig. 5. It is during the calibrating adjustment of the apparatus, to be later explained, that it will be desirable to temporarily hold this lever 62 in such vertical position and to accomplish this I provide a retaining pin 73 of proper diameter and length to be inserted through the aligned bores 72, 72 in the side walls 15 and 16 and the bore 71 of the lever 62, as indicated in dotted lines in Fig. 5.

The fulcrum block 64 of the lever 62 is pivoted on a fulcrum stud 74 carried by a carriage 75 which is mounted on the frame wall 14 to slide vertically in slideways 76 and is retained in said slideways by gib plates 77, as clearly shown in Fig. 3. A take-up spring 78 seated in a pocket in said carriage and bearing against the adjacent edge of the lever 62 serves to eliminate free play at this fulcrum connection and to automatically compensate for wear thereof.

As previously stated, the rate of ratio change as controlled by the temperature responsive means will be proportional to the coefficient of expansion of the fluid to be metered. This is for the reason that the coefficient of expansion of oils is a function of the A. P. I. table of gravities. That is, it increases as the A. P. I. gravity increases. Therefore, in order to condition the apparatus for metering oils of different gravities, there is provided a means for varying the lever arm ratio of the lever 62 by longitudinally adjusting the fulcrum block 64 in the elongated slot 63 thereof. This means comprises a micrometer screw 79 which passes through a screw-threaded bore in the fulcrum carriage 75 and is rotatably journaled near its opposite ends in opposed bosses 80, 80 formed on the frame wall 14, said screw 79 being retained against axial movement by a collar 81 secured on its lower end and by a graduated adjusting knob 82 secured on its opposite end. A gravity indicating means is associated with the fulcrum carriage 75 and comprises an indicator arm or pointer 83 which projects through an elongated slot in the frame wall 16 to travel along a visual gravity indicating scale 84 mounted on the exterior surface of said wall, as shown in Figs. 3, 5 and 6.

The upper end of the lever 62 is connected with the clevis frame 38 of the variable ratio transmission mechanism 32 by a connecting link 85 and a pivot block 86, said pivot block being adjustably secured to said clevis frame 38 by an eccentric lock bolt 87. The connecting link 85 has bifurcated opposite ends respectively embracing the lever 62 and the pivot block 86 and pivotally connected thereto by the respective pivot pins 88 and 89, as shown in Fig. 1. Take-up springs 90 and 91 are seated in suitable pockets formed in the link 85, the spring 90 engaging the edge of the lever 62 adjacent the pivot pin 88 and the spring 91 engaging the adjacent end of the pivot block 86. These springs eliminate free play at these link connections and automatically compensate for wear thereof, in a manner similar to that of the previously described springs 70 and 78.

In the conditioning of the above described apparatus for use, the clamp screw 69 is loosened to free the stem 59 of the thermosensitive "Sylphon" 56, and the lever 62 is brought to a vertical position parallel to the adjusting screw 79 and is temporarily held in such position by the retaining pin 73 which will be inserted in the frame bores 72 to extend through the bore 71 in the lower end of said lever. With the lever 62 in this vertical position, the thermosensitive "Sylphon" 56 will be calibrated to hold said lever in such position, at the fixed standard of 60° F., and the clamp screw 69 then will be tightened to maintain this relationship. The transmission mechanism 32 will now be calibrated by loosening the eccentric lock bolt 87 and rotating said bolt to an extent which will cause the counter unit 20 to register exactly one gallon when one gallon has passed through the meter. Theoretically this would be a one to one or direct drive adjustment of the transmission mechanism 32. However, it will be understood by those skilled in the art that, while such calibration may not exactly conform to the theoretically perfect one to one ratio, due to slight imperfections in the manufacture of the parts involved, it will in a practical sense produce an accurate calibration of the desired character.

To condition the calibrated mechanism to compensate for temperature changes of a liquid to be metered and which is of a certain specific gravity, the fulcrum of the compensating lever 62 will be adjusted to determine the lever arm ratio of said lever in accordance with the coefficient of expansion of said certain liquid so as to establish the required rate of compensation necessary for that liquid.

This is accomplished by manually rotating the micrometer screw 79 to translate the fulcrum carriage 75 and adjust the fulcrum 64 in the lever slot 63 to a position which will establish the required rate of compensation. Such adjustment may be made with the aid of the indicating pointer 83 and visual scale 84 to acquire a reasonably close adjustment, and with the aid of the graduated micrometer knob 82 to secure a finely accurate adjustment.

With the withdrawal of the retaining pin 73 to release the lever 62 from restraint, the apparatus is in condition for metering the selected liquid.

During the metering operation, the thermosensitive "Sylphon" tube 56 will, due to temperature changes of the liquid, transmit a temperature compensating movement to the lever 62 which may aptly be termed a gravity compensating lever in that it varies the temperature compensating movement in proportion to the gravity or the expansion coefficient of the metered liquid.

This temperature compensating movement, modified in proportion to the liquid gravity, is transmitted, through the connecting link 85 and pivot block 86, to the clevis frame 38 of the transmission mechanism 32 to translate the crownwheel 41 thereof and automatically vary the driving ratio of said mechanism in the manner previously described.

Thus there is provided between the measuring mechanism of the meter and the counter unit 20 a constant mesh gear transmission automatically variable as to its driving ratio in response to temperature variations of the fluid delivered to the meter so that said counter unit 20 will not indicate the actual volume of the metered liquid, but rather its volume at the sales standard of 60° F. Of course, should the temperature of the liquid being metered be 60° F. at the time of delivery, then there would be no temperature correction transmitted to the transmission mechanism and the counter unit 20 will, for such 60° F. sales standard, indicate the exact volume passed through the meter.

Simultaneously with the operation of the counter unit 20 will be the operation of the counter unit 21, which will, due to its constant ratio driving connection with the metering mechanism at all times indicate the actual volume of the metered liquid regardless of its temperature or gravity, such indication being in what is known in the trade as "wet gallons."

It will be pointed out that when the apparatus has been calibrated to the sales standard of 60° F., as above explained, no further calibration as to temperature standard is required until it becomes necessary to adopt a different temperature standard, and that when the mechanism has been thus calibrated to a definite sales temperature, it may easily and quickly be conditioned for liquids of different specific gravities and coefficients of expansion.

This is accomplished by actuating the micrometer screw 79, in the manner previously explained, to adjust the fulcrum 74 of the gravity compensating lever 62 and change its lever arm ratio in proportion to the specific gravity or coefficient of expansion of the particular liquid to be metered.

From the foregoing it will be apparent that the disclosed apparatus provides a temperature compensating liquid meter involving a metering mechanism and a counter combined with an intermediate variable ratio or variable speed transmission mechanism which is controlled by thermosensitive means responsive to temperature changes of the metered fluid and by motion transmitting connections between the thermosensitive means and the transmission mechanism and which includes adjustable provisions to vary the rate of compensation in proportion to the specific gravity or coefficient of expansion of the fluid to be metered, whereby the apparatus may be conditioned for fluids of different specific gravities or coefficients of expansion.

While I have shown the preferred form of my invention, it is to be understood that various changes may be made in its construction by those skilled in the art without departing from the spirit of the invention as defined in the appended claims.

Having thus described my invention, what I claim and desire to secure by Letters Patent is:

1. In combination, a fluid meter having a metering mechanism, a counter, and a thermosensitive driving connection between the metering mechanism and the counter positively and continuously driving said counter while the meter is in operation, said driving connection being capable of infinite driving ratio variations between the minimum and maximum ratio capacities thereof and including constantly intermeshing drive and driven gears relatively shiftable to vary the pitch of such intermesh whereby to vary said driving ratio.

2. In combination, a fluid meter having a metering mechanism, a counter, a driving connection between the metering mechanism and the counter, a variable speed transmission mechanism incorporated in said driving connection to enable varying of the operation of the counter relative to the operation of said metering mechanism, said variable speed mechanism providing a positive and continuous drive capable of infinite driving ratio variations between the minimum and maximum ratio capacities thereof and including constantly intermeshing drive and driven gears relatively shiftable to vary the pitch of such intermesh, and a thermosensitive control mechanism associated with said variable speed transmission mechanism and influenced by temperature changes of the fluid being metered to automatically effect relative shifting of said drive and driven gears to vary the ratio of operation of the counter relative to the operation of the metering mechanism.

3. In combination, a fluid meter having a metering mechanism, a counter, a driving connection between the metering mechanism and the counter, a thermostatically controlled variable speed transmission mechanism incorporated in said driving connection and varied by the temperature of fluid passing through the meter to automatically vary the operation of the counter relative to the operation of the metering mechanism, said transmission mechanism positively and continuously transmitting the drive through said driving connection and capable of infinite driving ratio variations between the minimum and maximum ratio capacities thereof and including constantly intermeshing drive and driven gears relatively shiftable to vary the pitch of such intermesh in response to temperature changes of said fluid whereby to vary said driving ratio to compensate for said temperature changes.

4. In combination, a liquid meter having a metering mechanism, a counter, a driving connection between the metering mechanism and the counter, a variable speed transmission incorporated in said connection to enable varying of the operation of the counter relative to the operation of the metering mechanism, said transmission mechanism transmitting a positive and continuous drive between the metering mechanism and the counter and capable of infinite driving ratio variations between its minimum and maximum ratio capacities and including constantly intermeshing drive and driven gears relatively shiftable to vary the pitch of such intermesh whereby to vary the driving ratio, and thermosensitive means operatively connected to said variable speed transmission mechanism and responsive to temperature changes of the liquid being metered to automatically effect relative shifting of said drive and driven gears and thereby automatically vary the operation of the counter relative to the operation of the metering mechanism.

5. In combination, a liquid meter having a metering mechanism, a counter, a driving connection between the metering mechanism and the counter, a variable speed transmission incorporated in said connection to enable varying of the operation of the counter relative to the operation of the metering mechanism, said transmission mechanism transmitting a positive and continuous drive between the metering mechanism and the counter and capable of infinite driving ratio variations between its minimum and maximum ratio capacities and including constantly intermeshing drive and driven gears relatively shiftable to vary the pitch of such intermesh whereby to vary the driving ratio, thermosensitive means operatively connected to said variable speed transmission mechanism and responsive to temperature changes of the liquid being metered to automatically effect relative shifting of said drive and driven gears and thereby automatically vary the operation of the counter relative to the operation of the metering mechanism, and manually adjustable means for varying the effect of said thermosensitive means on the variable speed transmission mechanism.

6. In combination, a liquid meter having a metering mechanism, a counter, a driving connection between the metering mechanism and the counter, a variable speed transmission incorporated in said connection to enable varying of the operation of the counter relative to the operation of the metering mechanism, said transmission mechanism transmitting a positive and continuous drive between the metering mechanism and the counter and capable of infinite driving ratio variations between its minimum and maximum ratio capacities and including constantly intermeshing drive and driven gears relatively shiftable to vary the pitch of such intermesh whereby to vary the driving ratio, thermosensitive means operatively connected to said variable speed transmission mechanism and responsive to temperature changes of the liquid being metered to automatically effect relative shifting of said drive and driven gears and thereby automatically vary the operation of the counter relative to the operation of the metering mechanism, and means for adjusting said thermosensitive means.

7. In combination, a fluid meter having a metering mechanism, a counter, a transmission mechanism providing a positive driving connection between said metering mechanism and said counter and including constantly intermeshing drive and driven gears relatively shiftable to vary the pitch of such intermesh whereby to produce infinitely minute variations of the driving ratio thereof, and means responsive to temperature changes of the fluid being metered and automatically operative to effect relative shifting of said drive and driven gears and thus vary the driving ratio thereof to compensate for such temperature changes.

8. In combination, a fluid meter having a metering mechanism, a counter, a transmission mechanism of the constant mesh gear type providing a positive driving connection between said metering mechanism and said counter and including constantly intermeshing drive and driven gears relatively shiftable to vary the pitch of such intermesh whereby to vary the driving ratio thereof, thermosensitive means movable in response to temperature changes of the fluid being metered, and motion transmitting connections between said thermosensitive means and said transmission mechanism through which motion of said thermosensitive means is effective to relatively shift said drive and driven gears to vary their driving ratio thus to compensate for such temperature changes.

9. In combination, a fluid meter having a metering mechanism, a counter, a transmission mechanism of the constant mesh gear type providing a positive driving connection between said metering mechanism and said counter and including constantly intermeshing drive and driven gears relatively shiftable to vary the pitch of such intermesh whereby to vary the driving ratio thereof, thermosensitive means movable in response to temperature changes of the fluid being metered, and motion transmitting connections beween said thermosensitive means and said transmission mechanism through which motion of said thermosensitive means is effective to relatively shift said drive and driven gears to vary their driving ratio thus to compensate for such temperature changes, said motion transmitting connections including means adjustable to vary the rate of compensating movement transmitted to said transmission mechanism in proportion to the coefficient of expansion of the fluid being metered.

10. In combination, a fluid meter having a metering mechanism, a counter, a transmission mechanism of the constant mesh gear type providing a positive driving connection between said metering mechanism and said counter and including constantly intermeshing drive and driven gears relatively shiftable to vary the pitch of such intermesh whereby to vary the driving ratio thereof, thermosensitive means movable in response to temperature changes of the fluid being metered, and motion transmitting connections between said thermosensitive means and said transmission mechanism through which motion of said thermosensitive means is effective to relatively shift said drive and driven gears to vary their driving ratio thus to compensate for such temperature changes, said motion transmitting connections including a lever having an adjustable fulcrum and means for adjusting said fulcrum to vary the lever arm ratio of said lever in proportion to the coefficient of expansion of the fluid to be metered, whereby to condition the transmission mechanism for fluids of different coefficients of expansion.

11. In combination, a fluid meter having a metering mechanism, a counter, a transmission mechanism of the constant mesh gear type providing a positive driving connection between said metering mechanism and said counter and including constantly intermeshing drive and driven gears relatively shiftable to vary the pitch of such intermesh whereby to vary the driving ratio thereof, thermosensitive means movable in response to temperature changes of the fluid being metered, motion transmitting connections between said thermosensitive means and said transmission mechanism through which motion of said thermosensitive means is effective to relatively shift said drive and driven gears to vary their driving ratio thus to compensate for such temperature changes, and means for automatically eliminating free play in said motion transmitting connections.

PAUL RENFREW.